United States Patent [19]
Junod et al.

[11] Patent Number: 5,303,261
[45] Date of Patent: Apr. 12, 1994

[54] HIGH-THROUGHPUT PIPELINED COMMUNICATION CHANNEL FOR INTERRUPTIBLE DATA TRANSMISSION

[75] Inventors: Michael F. Junod, Bensalem, Pa.;
Edward J. Monastra, Voorhes, N.J.;
Chaim Strasberg, Philadelphia, Pa.

[73] Assignee: General Electric Company, Philadelphia, Pa.

[21] Appl. No.: 799,649

[22] Filed: Nov. 29, 1991

[51] Int. Cl.⁵ .................. H03K 11/00; H04L 25/60; H04L 25/64
[52] U.S. Cl. ..................... 375/4; 370/13.1; 178/70 R; 455/14
[58] Field of Search .............. 178/70 R, 705, 71 R, 178/71 B; 370/13.1, 16; 375/3, 4, 118, 121; 371/20.1; 455/7, 8, 14, 16

[56] References Cited

U.S. PATENT DOCUMENTS

| | | | |
|---|---|---|---|
| 4,159,535 | 6/1979 | Fuhrman | 375/118 X |
| 4,571,671 | 2/1986 | Burns et al. | 395/250 |
| 4,577,327 | 3/1986 | Nambu | 375/4 |
| 4,945,548 | 7/1990 | Iannarone et al. | 375/118 X |
| 5,081,646 | 1/1992 | Faunce | 375/121 X |
| 5,113,418 | 5/1992 | Szczepanek et al. | 375/118 |
| 5,132,987 | 7/1992 | Motohashi et al. | 375/3 |

Primary Examiner—Stephen Chin
Assistant Examiner—Bryan E. Webster
Attorney, Agent, or Firm—Geoffrey H. Krauss; William H. Meise

[57] ABSTRACT

A high-throughput bidirectional data communication channel is formed of a pipelined plurality M of stages, connected to the input/output (I/O) port of each of the pair of devices using the channel, and configured to allow interruptibility of data transmission by either device connected to the channel; either device may be sender or receiver and transmission of data may be interrupted by either device for any number of cycles and resumed without loss or duplication of data at the receiver. The channel uses pipelining to achieve longer distance parallel transmission of N plural data bits, while maintaining the maximum high speed throughput. The channel, and its associated data transfer protocol, supports bidirectional transmission of data between the two sourcing/terminating devices with maximum throughput being achieved by transmitting a word of parallel data during every clock cycle.

19 Claims, 1 Drawing Sheet

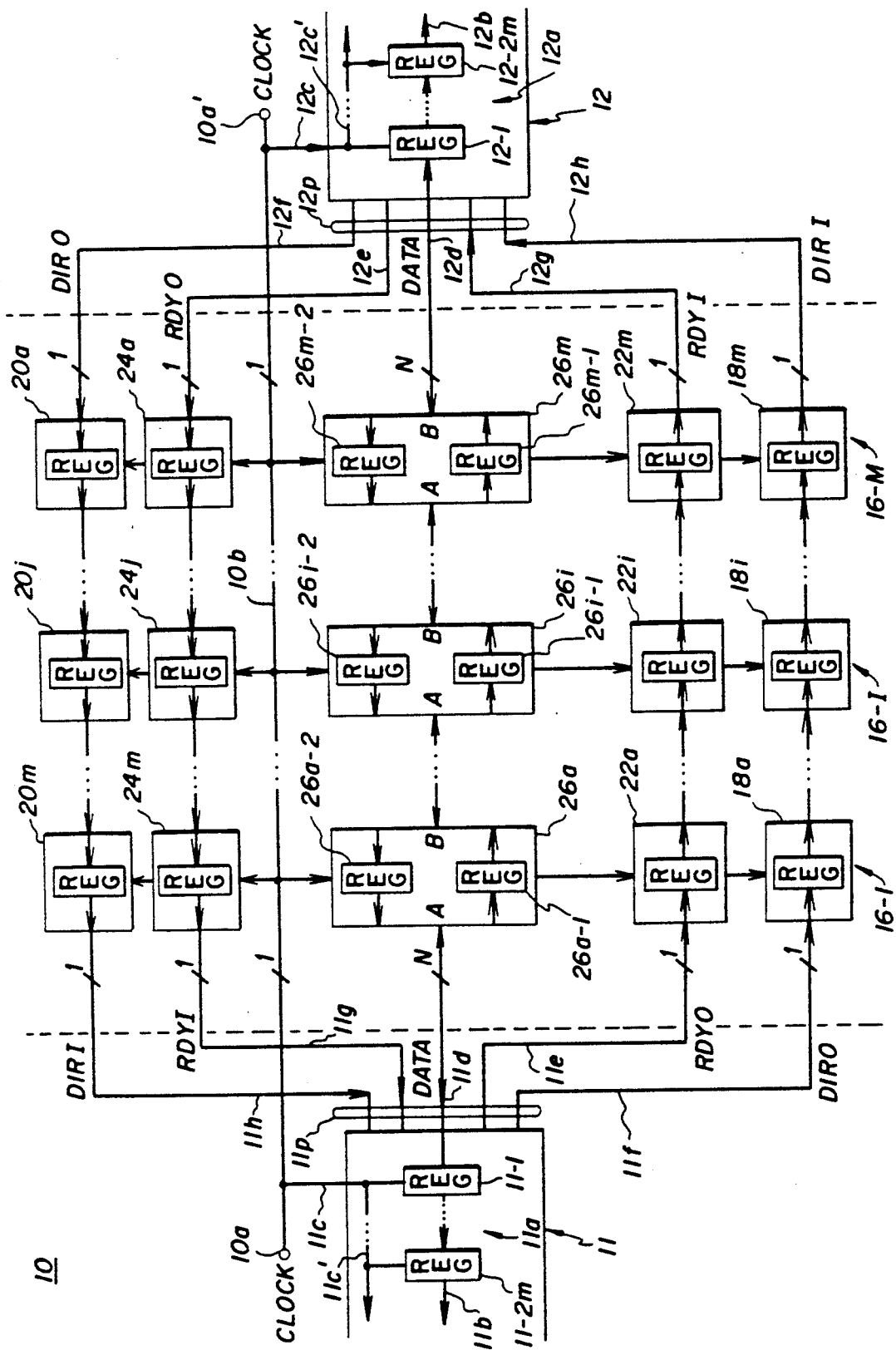

HIGH-THROUGHPUT PIPELINED COMMUNICATION CHANNEL FOR INTERRUPTIBLE DATA TRANSMISSION

BACKGROUND OF THE INVENTION

The present invention relates to data communication between separated devices and, more particularly, to a novel pipelined data communications channel structure for facilitating high-throughput bidirectional and interruptible data transmission between a pair of spaced-apart data devices.

It is well known to communicate data between different devices in a system; at any one instant in a single data communication channel, there is generally a single source device transmitting data from its output, although there may be more than one recipient device receiving that data at its input. High-speed data transfers may be enhanced by hardwired connection of the input/output (I/O) ports of a pair of devices together via a dedicated communications channel. It is our desire to provide such a data communications channel as a high-data-throughput bidirectional channel with sufficient robustness so as to allow not only relatively long distance communications between the associated pair of devices, but also facilitate interruption, by either device, of the data flow without loss of data, regardless of which device originated that flow.

BRIEF SUMMARY OF THE INVENTION

In accordance with the invention, a high-throughput bidirectional data communication channel is formed of a pipelined plurality M of stages, connected to the input/output (I/O) port of each of the pair of devices using the channel, and configured to allow interruptibility of data transmission by either device connected to the channel; transmission of data may be interrupted by the sender or the receiver for any number of cycles and resumed without loss or duplication of data at the receiver. The channel uses pipelining to achieve longer distance parallel transmission of N plural data bits, while maintaining the maximum high speed throughput. The channel, and its associated data transfer protocol, supports bidirectional transmission of data between the two sourcing/terminating devices with maximum throughput being achieved by transmitting a word of parallel data during every clock cycle and subject to a minimum set of handshaking control signals. Either device may be configured as sender or receiver. The maximum throughput T will be equal to F*N/8 bytes per second, where F is the clock frequency in cycles per second and N is the number of bits per parallel word. The channel has four control lines, with each device sourcing two unidirectional control signals, a DIR signal for data direction and an RDY signal for signaling presence of valid data at each clock cycle. The number N of parallel data bits per channel is theoretically unlimited.

In a presently preferred embodiment, if F=20 Mhz and N=32 bit-wide parallel data transmission is used, then a channel throughput of 80 Mbytes/sec. is obtained. The desired interruptibility of data transmission by the receiver, with M pipelined stages between the two devices, is provided by including enough available storage in the receiving device input queue for temporary storage of at least 2M data words, in order to absorb the data left in the pipeline after the time of interruption.

BRIEF DESCRIPTION OF THE DRAWING

The sole FIGURE is a schematic block diagram of a data channel in accordance with the present invention.

DETAILED DESCRIPTION OF A PREFERRED EMBODIMENT

Referring to the sole FIGURE, a portion 10 of a digital data system contains a first device 11 and a second device 12, each containing an input queue means 11a or 12a having a plurality of data registers pipelined along the device internal data bus 11b or 12b, respectively. Clock signals are provided by system clock means (not shown) to clock terminals 10a/10a' and thence via a system-wide clock bus 10b to the various individual device clock inputs 11c or 12c, and the like. Transfer of data into, or out of each device data I/O port 11d/12d is partially controlled by the clock signals and partially by a data-transfer-ready RDY O output signal, sourced from an associated output 11e/12e, and a direction-setting DIR O output signal, sourced from an associated output 11f/12f; the ready signal is received at an associated ready RDY I signal input 12g/11g of the other device and the direction signal is received at an associated directional DIR I signal input 12h/11h of the other device. The N parallel data I/O lines and the four control lines (DIR O, RDY O, RDY I and DIR I) can be considered to enter/leave the device 11/12 and connect to any inter-device communications channel, at a device communications port 11p/12p.

In accordance with the invention, the devices are interconnected for digital data communications via an interconnecting communications channel 14. The channel 14 comprises a plurality M of pipelined repeater stages 16, commencing with a first stage 16-1 and ending with a final stage 16-M, where each stage 16-I exists for $1 \leq I \leq M$. The information input by the sending device into one end of the channel is passed to a next subsequent stage responsive to a next cycle of the clock signal on system-wide clock bus 10b, which is coupled to all of channel stages 16; the information in any stage is passed to the next stage, or out of the last stage to the input of the receiving device, responsive to an associated clock signal pulse. Thus, a pipelined channel of M stages requires M sequential clock signals for a parallel data word, or any control bit, entering the channel at a time $t_o$ to travel through the channel and emerge at the opposite device at a later time $t_1$, where $t_1 = t_0 + M*T_c$ and $T_c$ is the clock cycle time. Each pipeline stage 16I comprises: a first register means 18i for sequentially transmitting a first DIR O signal in a first (e.g. left-to-right) direction; a second register means 20i for sequentially transmitting another DIR O signal (completely independently of transmission of the first DIR signal) in a second direction, opposite to the first direction; a third register means 22i for sequentially transmitting a first RDY O signal in the first direction; a fourth register means 24i for sequentially transmitting another RDY O signal in the second direction, independently of the first RDY signal transmission, is provided; and a data transfer means 26i. The data transfer means allows data to be transmitted in either direction, although not in both directions at once; each means 26i may have a single register and suitable logic and gating means to reverse the direction of data input and output as needed, or, as shown, may have a pair of data-transfer register means 26i-1 and 26i-2, permanently arranged for data transfer in opposite directions, for each of the N bits of parallel data to be transferred. The actual connection at an instant of one or the other of register means 26i-1 or 26i-2 will be controlled by the transfer direction established by the data transfer ready RDY and direction DIR signals in the means 18i/20i/22i/24i of that stage. For example, assume that the non-requesting RDY condition is the logic zero state and that the state of the DIR signal indicates the data transmission direction; initially, both of the RDY O and RDY I signals at both ports 11p and 12p are all at the logic zero level, as transmission is not then requested or occurring. The DIR signals can be at any set of conditions, because no direction is implemented without a RDY signal. At some later time $t_a$, device 11 desires to sent data to device 12, so that the DIR O signal changes to a logic one level at device 11 output 11f; this signal is clocked through the plurality M of channel pipeline stages and appears at device 12 input 12h at time $t_b = t_a + M*T_c$. Receipt of this signal inhibits device 12 and that device outputs a non-requesting-state (i.e. logic zero) DIR signal, along with a RDY logic one signal, to signify that device 12 is ready to receive. After another M clock cycles, i.e. at time $t_c = t_b + M*T_c$, the device 12-is-ready DIR I and RDY I signals are received at respective device 11 inputs 11h and 11g; the channel is now ready for data transmission to commence from device 11 to device 12, when the RDY O signal changes to the logic one state at output 11e. When data transmission is completed, the RDY O signal changes to the logic zero state. The other device can now transmit its data, by first sending a DIR O logic one state as a request for direction agreement and receiving a confirming logic zero DIR I response, along with a RDY I signal input. If either device must interrupt a transmission, that device changes the state of its RDY O signal, which state transition reaches the other device after M clock pulses and causes an interrupt sequence to occur, with the receiving device still inputting data for the next M or 2M clock cycles, dependent on whether that device was the sender or receiver at the time of the interrupt.

Maximum data throughput T rate is $T = F*N/8$ bytes per second, where F is the clock frequency, for the preferred situation where a N-bit-wide word of parallel data is transferred to a next stage for each cycle of the clock signal. For example, in a system using a 32 bit microcomputer operating at 20 MHz, if the clock rate of 20 Mhz. is used with the full 32 bit-wide parallel data word (as may be found in several 32 bit microcomputing environments presently available), a high data transfer rate of 80 Mbytes/sec. is realized. This clocked transfer through a pipeline of M stages allows data to be transferred over relatively large distances, with each stage 16 acting as a data repeater; the distance between devices can now be up to about M times greater than the distance obtainable between directed connected devices.

Each device can halt the transfer of data, by changing the state of its sourced RDY signal to a logic zero state. If the device then transmitting data desires to interrupt the data transmission, that transmitting device simply halts its transmission and concurrently sets its RDY O signal to a logic 0 state. The receiving device will absorb the M data words that are presently traversing the M stages of the channel pipeline, before detecting the absence of valid data at its input port, when the RDY I input signal changes to the logic 0 state. If the device then receiving data desires to interrupt a data transmission, the receiving device must have sufficient internal data storage to absorb an additional 2*M data words. At the time that the receiving device desires to interrupt the data transmission, that interrupting device must set its RDY O output to a logic 0 state. A total of M clock cycles are required for the interruption signal state to be clocked through the channel pipeline stages to the transmitting device, before the transmitting device can take suitable action. In the same M clock cycles between the time that the interrupt is issued at the receiving device and received at the transmitting device, up to M words of parallel data could have been transmitted through data means 26 and along the channel. Since an additional word of data could have entered the channel for each clock cycle between the sending of the interrupt state and its receipt, the receiving device may need to access up to 2M additional pipeline-sequential words of data from the channel, and store that data into its input queue means 11a/12a. Each input queue means 11a/12a should include 2M pipelined register means 11-1 through 11-2m or 12-1 through 12-2m, so that the desired interruptibility of data transmission by the receiver, with M pipelined stages between the two devices, is provided by providing the receiver with enough available storage in its input queue for at least 2M data words, in order to absorb the data left in the pipeline after the time of interruption. Transmission of data may thus be interrupted by either device for any number of cycles and thereafter resumed, without loss or duplication of data at the receiver.

While one presently preferred embodiment of our interruptible high-throughput pipelined communications channel has been described in some detail herein, those skilled in the art will now recognize that many variations and modifications will become apparent. It is our intent, therefore, to be limited only by the scope of the appending claims and not by way of the details and instrumentalities presented herein.

What is claimed is:

1. Communications channel apparatus for digital data transfer between first and second spaced-apart devices in a system, comprising:

clock means for providing a periodic transfer signal; and a plurality M of pipeline transfer stages, through which said data is sequentially transferred between a data I/O port of a sending one of said devices and a data I/O port of a receiving one of said devices; each of said transfer stages having register means for temporarily storing all bits of a N-bit-wide word of parallel data input for transfer, responsive to a first clock signal, and then transferring all of the stored data bits, responsive to a next clock signal, to a next one of a subsequent stage and the receiving device, if no further stages exist in the pipeline.

2. The communications channel of claim 1, wherein each device sources both a data-ready-for-transfer RDY signal and a data-direction DIR signal to the channel for transmission to the other device, with the readiness of the device to respectively transmit and receive data being determined by the associated one of opposite data states of the DIR signal.

3. The communications channel of claim 2, wherein each pipeline stage includes register means for temporarily storing and then transferring each of the DIR and RDY signals from each of the two devices.

4. The communications channel of claim 3, wherein each stage includes four independent register means, each configured to store and subsequently transmit a different one of the DIR and RDY signals.

5. The communications channel of claim 4, wherein the direction of data travel through the channel is established by that one of the DIR signal first at a selected state contemporaneous with the presence of the RDY signal from the same device at another selected state.

6. The communications channel of claim 5, wherein either device can interrupt data transmission through the channel.

7. The communications channel of claim 6, wherein the N data storage means of each pipeline stage are configured for bidirectional data transfer.

8. The communications channel of claim 2, wherein the direction of data transfer through the N stages of the channel is established by that one of the DIR signal first at a selected state contemporaneous with the presence of the RDY signal from the same device at another selected state.

9. The communications channel of claim 1, wherein each device has input queue means each containing a pipeline of up to 2M sequential, clocked register means for receiving the channel information.

10. Communications channel apparatus for digital data transfer between first and second spaced-apart devices in a system, with each device sourcing both a data-ready-for-transfer RDY signal and a data-direction DIR signal to the channel for transmission to the other device, comprising:

clock means for providing a periodic transfer signal; and a plurality M of pipeline transfer stages, through which said data is sequentially transferred between a data I/O port of a sending one of said devices and a data I/O port of a receiving one of said devices, with the direction of data travel through the channel being established by that one of the DIR signal first at a selected state contemporaneous with the presence of the RDY signal from the same device at another selected state; each of said transfer stages having four independent register means, each configured for temporarily storing and then transferring each of the DIR and RDY signals from each of the two devices and also having register means for temporarily storing a N-bit-wide word of parallel data input for transfer, responsive to a first clock signal, and then transferring the stored signals and data, responsive to a next clock signal, to a next one of a subsequent stage and the receiving device, if no further stages exist in the pipeline.

11. The communications channel of claim 10, wherein either device can interrupt data transmission through the channel.

12. The communications channel of claim 11, wherein the N data storage means of each pipeline stage are configured for bidirectional data transfer.

13. The communications channel of claim 10, wherein the N data storage means of each pipeline stage are configured for bidirectional data transfer.

14. The communications channel of claim 10, wherein each device has input queue means each containing a pipeline of up to 2M sequential, clocked register means for receiving the channel information.

15. Communications channel apparatus for digital data transfer between first and second spaced-apart devices in a system, with each device sourcing both a data-ready-for-transfer RDY signal and a data-direction DIR signal to the channel for transmission to the other device, comprising:

clock means for providing a periodic transfer signal; and a plurality M of pipeline transfer stages, through which said data is sequentially transferred between a data I/O port of a sending one of said devices and a data I/O port of a receiving one of said devices; each of said transfer stages having register means for temporarily storing a N-bit-wide word of parallel data input for transfer, responsive to a first clock signal, and then transferring the stored data, responsive to a next clock signal, to a next one of a subsequent stage and the receiving device, if no further stages exist in the pipeline; and wherein the direction of data transfer through the N stages of the channel is established by that one of the DIR signals first at a selected state contemporaneous with the presence of the RDY signal from the same device at another selected state.

16. The communications channel of claim 15, wherein each pipeline stage includes register means for temporarily storing and then transferring each of the DIR and RDY signals from each of the two devices.

17. The communications channel of claim 15, wherein the direction of data travel through the channel is established by that one of the DIR signal first at a selected state contemporaneous with the presence of the RDY signal from the same device at another selected state.

18. The communications channel of claim 15, wherein the N data storage means of each pipeline stage are configured for bidirectional data transfer.

19. The communications channel of claim 15, wherein each device has input queue means each containing a pipeline of up to 2M sequential, clocked register means for receiving the channel information.

* * * * *